UNITED STATES PATENT OFFICE.

GEORGE A. MARINER AND JAMES FISH, OF CHICAGO, ILLINOIS.

IMPROVED BAKING-POWDER.

Specification forming part of Letters Patent No. 45,419, dated December 13, 1864.

*To all whom it may concern:*

Be it known that we, GEORGE A. MARINER and JAMES FISH, (constituting the firm of Mariner & Fish,) in the city of Chicago, county of Cook, and State of Illinois, have discovered a new and Improved Mode of Preparing Baking-Powder; and we do hereby declare that the following is a full and exact description thereof.

The nature of our discovery consists in the use of gum-arabic, dextrine, or other soluble gums or mucilaginous substances as ingredients in the composition of baking-powders in addition to the acid and alkaline or other gas-producing ingredients used in such preparations.

The usefulness and advantage of our discovery consist in the fact that when the above-described substances are used in the composition of baking-powders the gases, when liberated, escape with difficulty, and are thereby economized and made more effective, the baking-powders are rendered more nutritious and wholesome. Besides, the articles of food prepared therewith are much superior to those obtained by the use of powders not thus prepared.

In order to apply our discovery it is simply necessary to mix intimately any one or any combination of the above-described mucilaginous substances in the form of a dry powder with any of the gas-generating preparations used in the composition of baking-powders—as, for example, with a preparation formed by combining in the proper proportions tartaric acid, or bitartrate of potash, or acid phosphate of lime with bicarbonate of soda or bicarbonate of potash.

The proportion of gum-arabic or other mucilaginous constitutent may be greatly varied, provided only it be not made too small. We find it best to use not less than one-third of one part, and generally not more than one whole part, by weight, of the gum with one part of a mixture formed by adding three and one-half parts of tartaric acid or nine parts of bitartrate of potash or nine of acid phosphate of lime to four of bicarbonate of soda. Three tea-spoonfuls of such baking-powder, made as above described, should be taken for each quart of flour used.

What we claim as our discovery, and desire to secure by Letters Patent, is—

1. The preparation, as herein described, of a baking-powder by the combination of gum-arabic, dextrine, or other soluble gums or mucilaginous substances with the alkaline bicarbonates and the acids or acid substances, or with any other of the gas-generating preparations in common use for such purposes.

2. We do not claim the alkaline bicarbonates, the acid or acid substances, or any other of the gas-generating preparations above mentioned; but we do claim the combination of the above-described mucilaginous substances with the same.

G. A. MARINER.
JAMES FISH.

Witnesses:
JOHN SEARS,
JAMES MUIR.